United States Patent [19]
Cloonan et al.

[11] Patent Number: 5,687,172
[45] Date of Patent: Nov. 11, 1997

[54] TERABIT PER SECOND DISTRIBUTION NETWORK

[75] Inventors: Thomas Jay Cloonan, Downers Grove; Gaylord Warner Richards, Lisle, both of Ill.

[73] Assignee: Lucent Technologies Inc., Murray Hill, N.J.

[21] Appl. No.: 366,707

[22] Filed: Dec. 30, 1994

[51] Int. Cl.$^6$ .................................................. H04L 12/56
[52] U.S. Cl. ................................... 370/395; 370/905
[58] Field of Search .................................. 370/50, 54, 55, 370/56, 58.1, 59, 60, 60.1, 63, 64, 65.5, 67, 68, 94.1, 94.2, 58.2, 58.3, 351, 352, 355, 360, 361, 367, 369–374, 380, 387–389, 392, 395, 396, 410–412, 414–419, 428, 430, 427, 905; 359/117, 139

[56] References Cited

U.S. PATENT DOCUMENTS

| | | | |
|---|---|---|---|
| 4,035,584 | 7/1977 | Lurtz | 370/63 |
| 4,592,048 | 5/1986 | Beckner et al. | 370/60 |
| 4,872,158 | 10/1989 | Richards | 370/58.1 |
| 4,988,993 | 1/1991 | Hwang et al. | 340/825 |
| 4,993,016 | 2/1991 | Richards | 370/54 |
| 5,122,892 | 6/1992 | Cloonan et al. | 359/117 |
| 5,157,654 | 10/1992 | Cisneros | 370/60 |
| 5,197,064 | 3/1993 | Chao | 370/60 |
| 5,256,958 | 10/1993 | Eny et al. | 370/56 |
| 5,258,978 | 11/1993 | Cloonan et al. | 370/60 |
| 5,291,482 | 3/1994 | McHarg et al. | 370/60 |
| 5,311,345 | 5/1994 | Cloonan et al. | 359/139 |
| 5,345,441 | 9/1994 | Paker et al. | 370/54 |
| 5,414,704 | 5/1995 | Spinney | 370/60 |

OTHER PUBLICATIONS

Y. S. Yeh et al., "The Knockout Switch: A Simple, Modular Architecture for High–Performance Packet Switching", *ISS '87 AT&T Technical Papers*, pp. 287–311.

W. E. Stephens et al., "Terabit–per–Second Throughput Switches for Broadband Central Offices: An Overview", *IEEE LCS*, Nov. 1990, pp. 20–26.

K. Y. Eng et al., "A Growable Packet (ATM) Switch Architecture: Design Principles and Applications", *IEEE Transactions on Communications*, vol. 40, No. 2, Feb. 1992, pp. 423–430.

*Primary Examiner*—Douglas W. Olms
*Assistant Examiner*—Dang Ton
*Attorney, Agent, or Firm*—Jack R. Penrod

[57] ABSTRACT

A distribution network that has very low internal blocking, similar to that found in large N×N single crossbar networks, but without the complexity and cost of such a network. Further, this distribution network has only one stage to simplify and speed up the ability to find a path through the network to fulfill each request. The distribution network is a fabric of small crossbar switches which are organized into a plurality of pipes. Each of the pipes provides a path that could fulfill any request assuming that path is not currently busy. Sophisticated statistics are used to reduce the possibility of internal block to a very low level. The single stage of pipes simplifies the hunt for a path through the distribution network to a hunt for a pipe having the required path that is empty or idle. Because of the single stage and the simplified path hunting, a fabric of switches may be built that has a throughput of over one terabit per second.

12 Claims, 5 Drawing Sheets

TERABIT PER SECOND DISTRIBUTION NETWORK

CROSS REFERENCES

This application is related to the following co-pending applications:

"Terabit Per Second ATM Packet Switch Having Distributed Out-Of-Band Control", Thomas Jay Cloonan and Gaylord Warner Richards, Filing Date Dec. 30, 1994, and Ser. No. 08/367,489;

"Terabit Per Second Packet Switch", Thomas Jay Cloonan and Gaylord Warner Richards, Filing Date Dec. 30, 1994, and Ser. No. 08/366,704, now U.S. Pat. No. 5,544,160;

"Terabit Per Second Packet Switch Having Distributed Out-Of-Band Control of Circuit and Packet Switching Communications", Thomas Jay Cloonan and Gaylord Warner Richards, Filing Date Dec. 30, 1994, and Ser. No. 08/366,708, now U.S. Pat. No. 5,537,403;

"Method And Apparatus For Detecting And Preventing The Communication of Bit Errors On A High Performance Serial Data Link", Thomas Jay Cloonan and Gaylord Warner Richards, Filing Date Dec. 30, 1994, and Ser. No. 08/366,706, now U.S. Pat. No. 5,566,191;

"Improved Bandwidth Efficiency mBnB Coding And Decoding Method And Apparatus", Thomas Jay Cloonan and Gaylord Warner Richards, Filing Date Dec. 9, 1994, and Ser. No. 08/353,410, now U.S. Pat. No. 5,606,317;

"Apparatus And Method For Reducing Data Losses In A Growable Packet Switch", Thomas Jay Cloonan and Gaylord Warner Richards, Filing Date Dec. 30, 1994, and Ser. No. 08/366,705, now U.S. Pat. No. 5,550,815;

"A Terabit Per Second Packet Switch Having Assignable Multiple Packet Loss Probabilities", Thomas Jay Cloonan and Gaylord Warner Richards, Filing Date Aug. 31, 1995, and Ser. No. 08/522,209; and "Terabit Per Second ATM Packet Switch Having Out-Of-Band Control With Multicasting", Thomas Jay Cloonan and Gaylord Warner Richards, Filing Date Aug. 31, 1995, and Ser. No. 08/521,676.

1. Technical Field

The invention relates to large telecommunications switches and more particularly to large telecommunication switches that operate at aggregate throughputs of one terabit per second.

2. Description of the Prior Art

The demand for increased capacity of telecommunication switches continues to grow. This growth is spurred by plans for a National Information Infrastructure and multimedia communications. The synchronous transfer mode (STM), which presently is used for most telecommunications, is being supplemented by the higher data bandwidth asynchronous transfer mode (ATM). The ATM uses data packets to transfer telecommunications data. The growth projections of STM and ATM telecommunications indicate that telecommunications switches capable of carrying one terabit, i.e. 1,000,000,000,000 bits per second of information will be necessary in the near future. Further, much of the growth is expected to be in ATM packet communications.

ATM is a means of efficiently routing and transporting packets with stochastically-distributed arrival rates. ATM is a packet-oriented standard, but unlike most of its predecessors (X.25, frame relay, etc.), ATM uses short, fixed-length, presently 53-byte packets called cells, and it also uses a very streamlined form of error recovery and flow control. In fact, the ATM standard essentially eliminates most error protection and flow control at the link level, leaving these functions to higher level protocols at the edges of the network. This approach permits rapid routing of the relatively short cells with minimal network delay and jitter, making ATM compatible with voice, video, and data services. Elimination of the error protection within ATM is permitted because of recent advances in lightwave technologies that permit signal transmission with very low bit error rates. ATM is ideally suited for transmission over high speed, wideband transmission networks, such as the Synchronous Optical Network (SONET) which has become an industry standard for lightwave systems.

One well known type of telecommunication switch is call the crossbar switch. Originally the crossbar switch was a mechanical device which had each input connected to a respective bus bar and each output is connected to a respective bus bar. Often the input bus bars were all located parallel to each other in one plane and all the output bus bars were located parallel to each other in a second plane that was parallel to the first plane. Additionally, the input bus bar run at an angle relative to the output bus bars such that they cross, hence the name crossbar. Relays would make the connection from the input bus bar to the output bus bar if one was desired. The nice feature of the crossbar switch is that any of the inputs may be connected to any of the outputs, provided that that output is not already connected to some other input. Furthermore, if there was not any contention for an output, each of the inputs could be connected to its desired output. Electronic versions of the crossbar switch which use integrated transistors and/or solid state relays to provide the any input to any output connectivity do exist and are in use, but electronic crossbars, hereinafter simply crossbars, beyond 16 input and 16 output size, i.e. 16×16, are not commercially available. The reasons are straightforward, a 32×32 crossbar would have 1024 crosspoints. If five transistors are required to form a solid state relay for each cross point, then 5120 transistors are required just to do the relaying function, not to mention the line interfacing and control functions. This size is not prohibitive and a 32×32 crossbar seems to be within the integrated circuit art. For large sizes, e.g. 1024×1024, the number of cross points and solid state relays grows to 1,048,576. At five transistors per cross point, that means 5,242,880 transistors are required just to provide the connectivity of a 1024×1024 crossbar switch. Those densities presently only exist in dynamic RAM and high performance microprocessor integrated circuits. It is doubtful that there is sufficient market to justify production of such a circuit. Even if a 1024×1024 crossbar integrated circuit did exist, it could only use 1024 of its 1,048,576 cross points at one time. For all its complexity, a 1024×1024 crossbar switch only uses 0.1 percent of its transistors at any one time. For large crossbar switches, the flexibility and connectivity comes at a high technological and monetary price.

Since large crossbar switches are presently unduly complex and costly, most of the current architectural research and hardware/software development for ATM switches has concentrated on switches with relatively small aggregate bandwidths. Such switches are designed to meet near-term needs of the marketplace, but do not consider the potential growth. For example, most of the proposals within the LAN/WAN communications area have aggregate bandwidths ranging from 150 megabits per second to 12 gigabits per second. Furthermore, most of the published proposals within the telecommunications area disclose aggregate bandwidths ranging from 20 to 160 gigabits per second. As Eng et al. point out in their article entitled AA Growable Packet (ATM) Switch Architecture: Design Principles and Applications" IEEE Transactions Communications, Vol. 40, No. 2 dated February 1992, a growable packet switch is one that has an interconnect fabric connected to a group of output packet modules and operates according to the generalized knockout principle of Yeh et al. according to Eng et at. Extensions of most packet switch architectures to larger sizes usually produce switching systems that are cost prohibitive, size prohibitive, and/or physically unrealizable because of technology constraints. Eng et al. further state that the challenge facing the telecommunications industry is to develop an understanding of how a large switch can be constructed out of modest-size packet switches without sacrificing overall delay and/or throughput performance.

The design of any ATM switch must initially address two fundamental problems that have a profound effect on the overall performance of the switch. The first of these problems is cell or packet loss due to blocking within the interior of the switching fabric, and the second is cell or packet loss due to contention for a specific output port by two or more ATM cells that pass through the switch at the same moment in time.

It is an object of the invention to provide a switch fabric for high performance switch having a large throughput.

It is another object of the invention to provide a switch fabric having a large throughput with reduced complexity, yet low ATM cell loss probability due to internal blocking.

SUMMARY OF THE INVENTION

The aforementioned problems are solved and an advance in the art is achieved by providing a large throughput switch including a switch fabric that is less complex than a crossbar switch having the same number of inputs and outputs. Even though this large throughput switch is less complex, it still has sufficient nodes and interconnections to provide multiple paths between each input port and each output port. Each of these multiple paths is assigned such that it is independent from the other paths that could connect the same respective input and output port. Because of the independence of the multiple paths, if two or more communications attempt to use the same node of the switch fabric at the same time, an alternate path is nearly always available to prevent internally blocking of any of the communications. The switch fabric also has multiple outputs, which are capable of handling communication attempts to the same output port when used with buffered concentrator output modules, thus preventing most nearly all output blocking problems.

In accordance with another aspect of the invention, the aforementioned problems are solved and an advance in the art is achieved by providing a switch fabric for use in a telecommunications having a plurality of input lines connected to a plurality of line interfaces and a plurality of output lines connected to outputs of a plurality of output modules. The switch fabric includes a plurality of pipes and each pipe has a plurality of inputs, with each of these plurality of pipe inputs connecting to a respective output of the plurality of line interfaces in such a manner that each of the line interfaces has a fan-out that is the same as the number of pipes. Each of the pipes is a single stage network and it has only a single path from any line interface output to an output line via an output module of the plurality of output modules. Each of the output modules has a concentration ratio that is the same as the fan-out of the line interface outputs. Each path between an input line and its desired output line is arranged sufficiently independent from the other paths through the other pipes between that input line and that desired output line that the probability of internal blocking is low. Reducing the number of paths available to connect any input line to any output line to the same as the number of pipes substantially reduces the number of active devices needed without an equivalent rise in the internal blocking probability.

DETAILED DESCRIPTION

Figure 1:
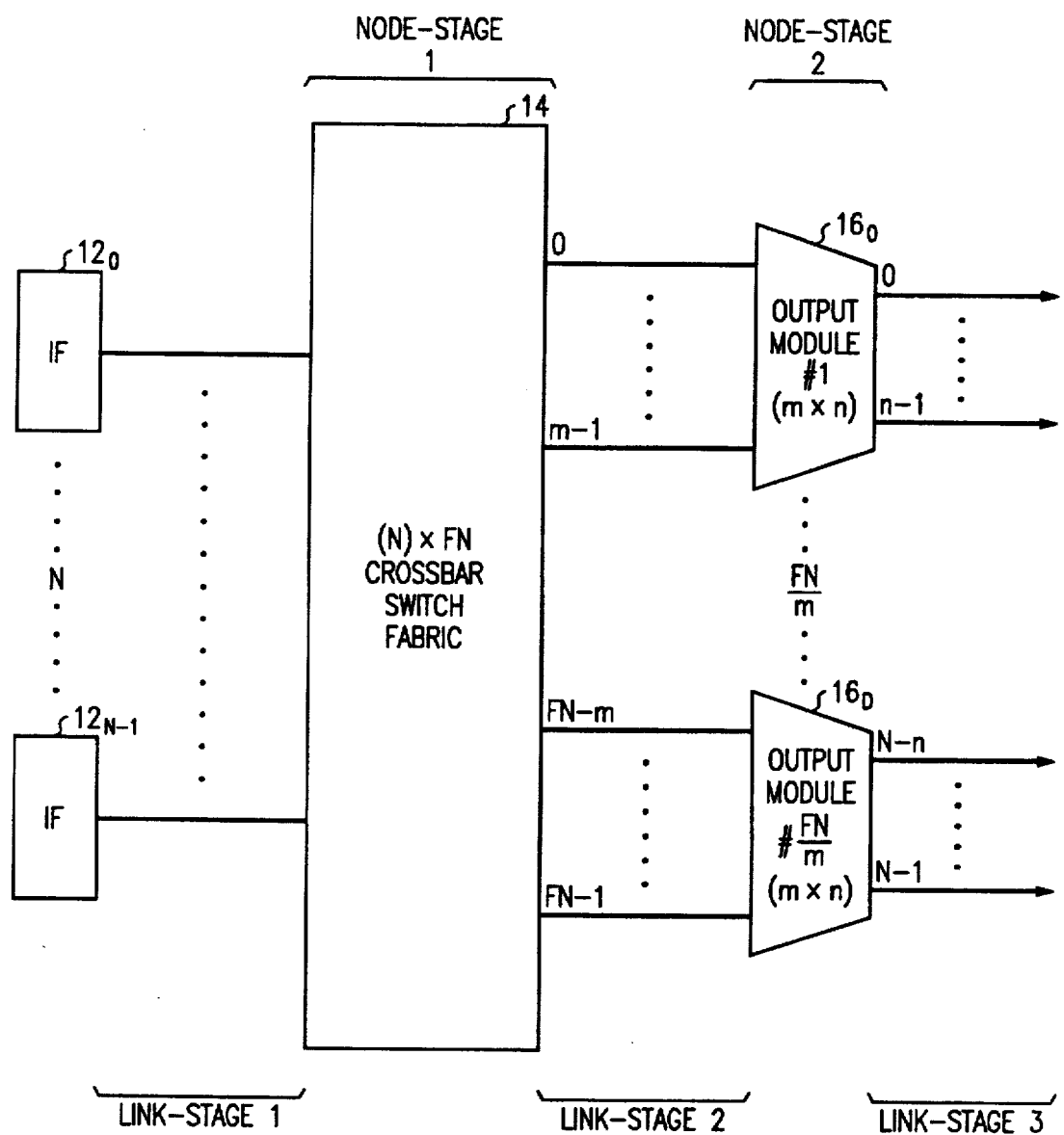
FIG. 1 is a block diagram of a general growable packet switch.

FIG. 1 is a diagram of a large switch 10 for ATM communications, and for STM communications as described later. Switch 10 has a number N of input interfaces $12_0$–$12_{N-1}$; a general distribution network 14, often called a switch fabric because the crossing links interconnecting the switch nodes give the appearance of a woven fabric, and buffered output modules $16_0$–$16_D$. For ATM operation, input interfaces $12_0$–$12_{N-1}$, are high speed digital amplifiers that serve as matching networks and power amplifiers for fanning out information received on their inputs to multiple input ports of the switch fabric 14. This fanout is then reversed at the output modules $16_0$–$16_D$ by including in each module an m×n concentrator. If the number of inputs is N and the number of outputs is N for large switch 10, the concentrator ratio of m/n must be equal to the fanout F. Further, the number of output modules D is equal to FN/m. All of these are relations within the architecture of growable packet switches.

For an N×N large switch 10, the architecture of the switch fabric 14 becomes a major design issue. Switch fabrics made up of multiple sequential stages of 2×2 or 3×3 crossbar switches have extremely complex packet path hunt controllers if the architecture uses out-of-band centralized control, and if an in-band localized self-routing control architecture is used localized blocking tends to occur because of lack of a global path hunting. On the other hand, a switch fabric 14 which uses a single stage N×N crossbar switch, where N is 256 more, yields an architecture that may have a very simple path hunt controller, and is non-blocking within the switch fabric, but is extremely complex and expensive to build.

Figure 2:
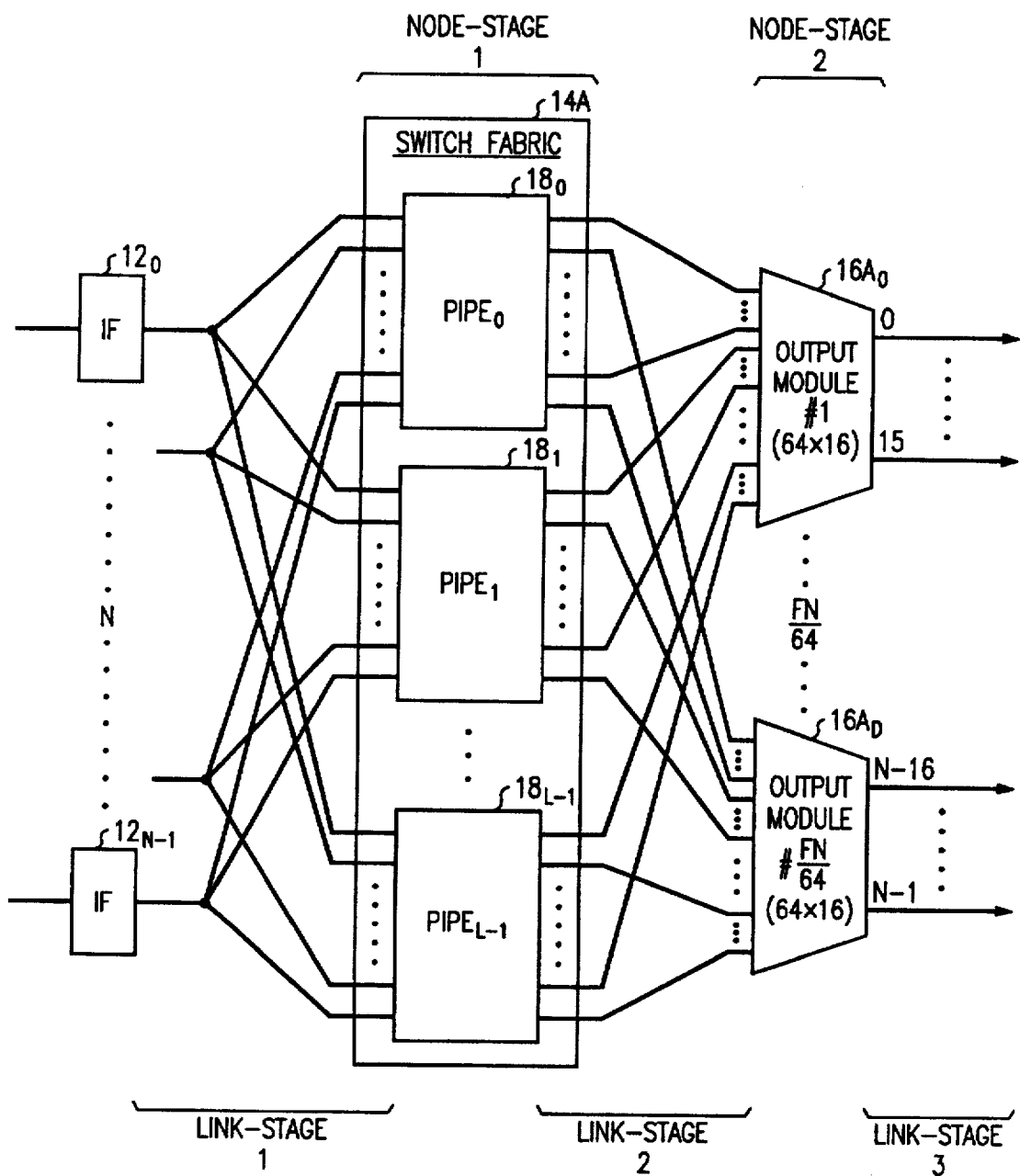
FIG. 2 is a block diagram of a growable packet switch architecture having a reduced complexity switch fabric according to the present invention.

Referring now to FIG. 2, a switch fabric 14A is shown according to one embodiment of the present invention. Switch fabric 14A is a single stage network, which means that a single path is all that is available between the output of the input interfaces $12_0$–$12_{-1}$ and the output modules $16A_0$–$16A_D$. No intermediate paths between stages of the switch fabric 14A exist.

The switch fabric 14A is made up of a number of switches, specifically crossbar switches. The crossbar switches provide multiple possible paths from each input port to each output port according to their control settings. Switch fabric 14A is not a full crossbar where each input port has a direct path to each output port, rather it is made up of a number of small crossbar modules. The switch fabric 14A, and its smaller crossbar module, have less internal connectivity relative to a full crossbar because of the greatly reduced number of switch points. To prevent this reduction from having too detrimental an effect on internal blocking, switch fabric 14A is deliberately provided with multiple paths to reduce the likelihood of internal blocking. The multiple paths are partitioned into groups. Each of these groups provides exactly one path between each input port and each output port of the switch fabric 14A. Each group, which is a sub-set of the switch fabric 14A, that provides exactly one path between each of the input ports connected to that group and each output port of the switch fabric 14A, is defined as a pipe. Thus, switch fabric 14A is made up of multiple pipes $18_0$–$18_{L-1}$.

Figure 3:
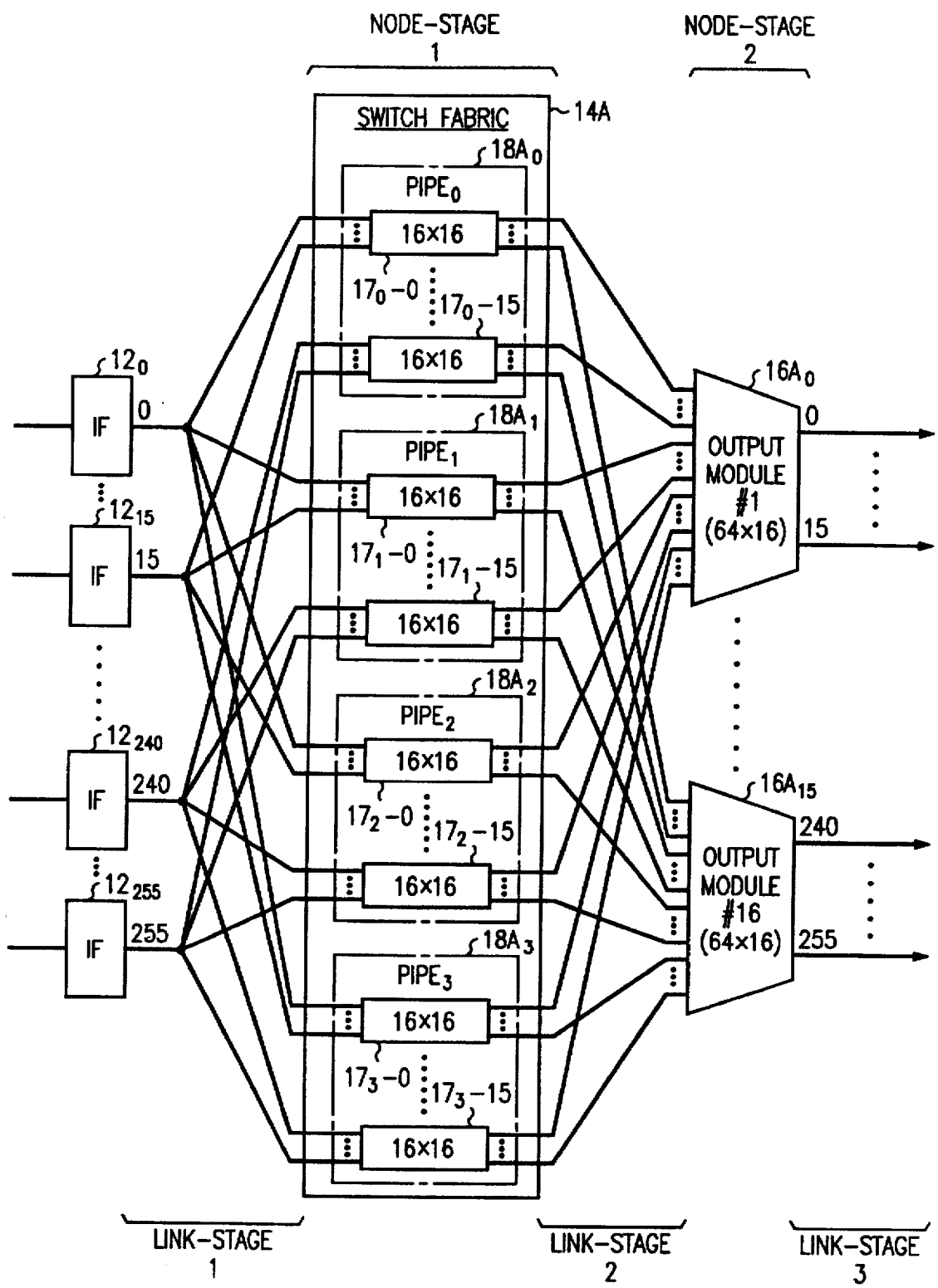
FIG. 3 is a block diagram of a specific embodiment of the switch fabric of FIG. 2.

Referring now to FIG. 3, a specific embodiment of the present invention is presented. Switch fabric 14A is made up of sixty four 16×16 crossbar switches $17_0$-0 to $17_0$-15, $17_1$-0 to $17_1$-15, $17_2$-0 to $17_2$-15 and $17_3$-0 to $17_3$-15 partitioned into four pipes $18A_0$–$18A_3$. The embodiment shown in FIG. 3 showing just four pipes is given by way of example and is not intended to be limiting as embodiments with less than four pipes and more than four pipes are also contemplated. This configuration (as mentioned above) has less internal connectivity than a fabric of a 1024×1024 crossbar switch or even four 256×256 crossbar switches. The pipes $18A_0$–$18A_3$ are essentially identical to one another, allowing for easy fabrication. Partitioning also has the advantage of allowing parallelization of path hunting, and thus yields shorter path hunt times.

Figure 4:
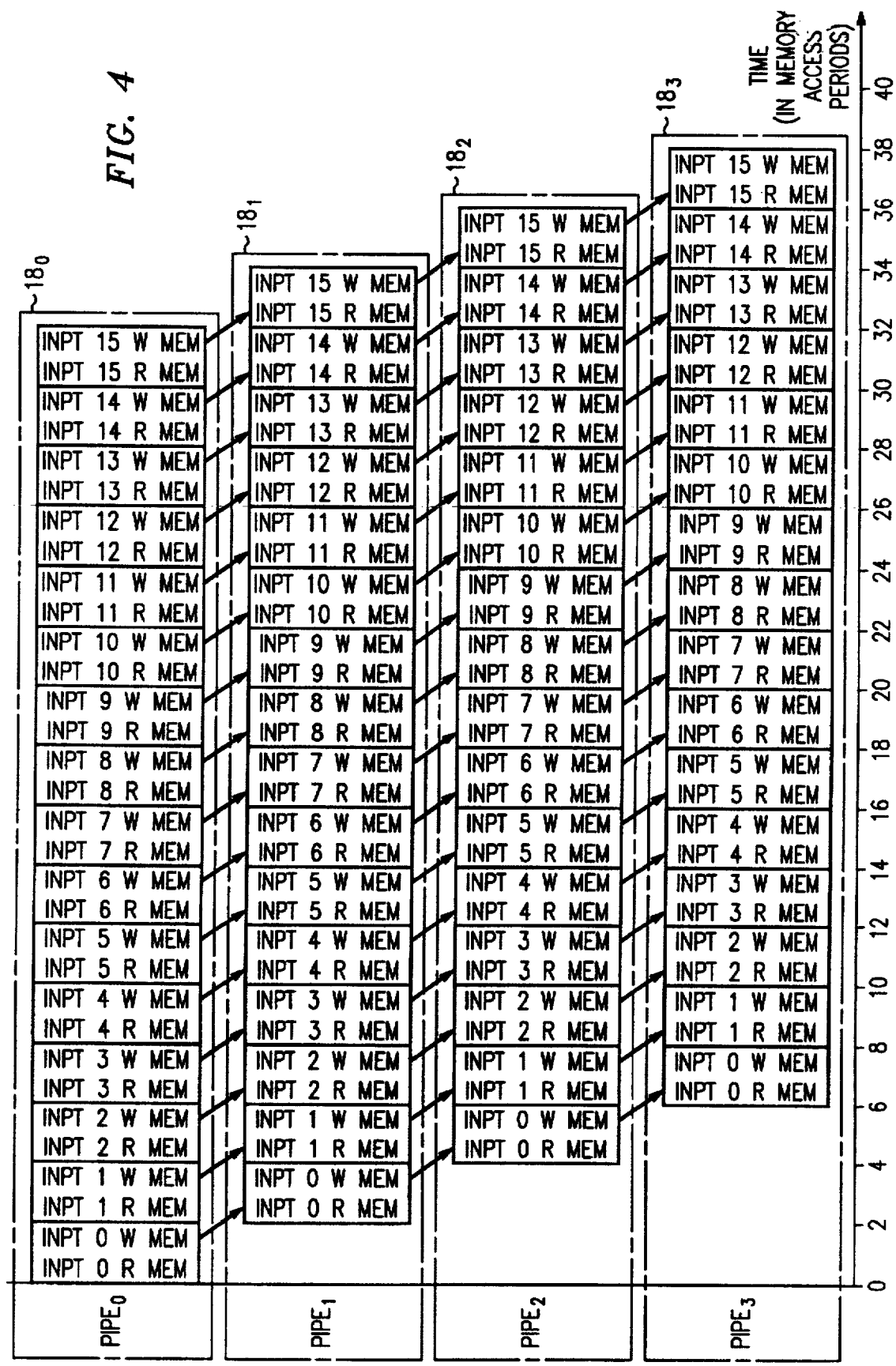
FIG. 4 is a timing diagram of the specific embodiment shown in FIG. 2.

Unfortunately, the reduced connectivity and identical pipe configuration embodiment of FIG. 3 yields a higher than acceptable probability of internal blocking. This is a result of the partitioning and also the fact that connections between the two hundred fifty six input ports, i.e. the output of the 256 input interfaces $12_0$–$12_{255}$, the sixty-four 16×16 crossbar switches $17_0$-0 to $17_0$-15, $17_1$-0 to $17_1$-15, $17_2$-0 to $17_2$-15 and $17_3$-0 to $17_3$-15 were determined by a very simple mapping function. This simple mapping function requires each input port (I) to be connected to exactly four of the sixty-four 16×16 crossbar switches (given by S0(I), S1(I), S2(I), and S3(I), and each of these four 16×16 crossbar switches must be located within a different and unique pipe of the switch fabric 14. However, the simple mapping function results in a somewhat undesirable arrangement of the input connections, because all sixteen of the input ports that converge on a single 16×16 crossbar switch in pipe $18A_0$ will also converge on a single 16×16 crossbar switch in pipe $18A_1$ and on a single switch in pipe $18A_2$ and on a single switch in pipe $18A_3$. If five or more of these input ports are simultaneously carrying ATM cells that are destined for a single output packet module of the simple mapping function of pipes $18A_0$ through $18A_3$, then only four of the ATM cells can be successfully routed, i.e. one through each of the four pipes, and the remaining ATM cells will be lost according to the knockout principle of Yeh et al. This loss is a direct result of the fact that there are exactly four paths between each input port and its desired output module. The actual cell loss probability that results from this arrangement of input connections can be determined according to the work of Eng, et at. mentioned previously. To make this determination, the operating characteristics of the individual 16×16 crossbar switches $17_0$-0 to $17_0$-15, $17_1$-0 to $17_1$-15, $17_2$-0 to $17_2$-15 and $17_3$-0 to $17_3$-15 in FIG. 3 are determined and carefully combined. For this determination, consider a timing diagram shown in FIG. 4. All of the arriving ATM cells request scheduling in pipe $18A_0$ first before moving on to pipes $18A_1$, $18A_2$ and $18A_3$. As a result, the 16×16 crossbar switches $17_0$-0 to $17_0$-15 in pipe $18A_0$ will receive an offered traffic load equal to the full traffic load entering the network. If the traffic load entering the network is $R_L$, then each of the 16×16 switches in pipe $18A_0$ must attempt to route the arriving ATM cells in the presence of a traffic load given by $R_a$=$R_L$. Each 16×16 crossbar switch $17_0$-0 to $17_0$-15 will be unsuccessful in its attempt to route an ATM cell whenever more than one cell simultaneously attempts to go to a particular output link. Thus, the cell loss probability of a single 16×16 crossbar switch in pipe $18A_0$ can be determined according to Eng et al. where m=1, n=1, and the link loading is given by $R_a$=$R_L$. Using these parameters and considering the single pipe $18A_0$ 16×16 crossbar switch as a small Growable Packet Switch, the resulting cell loss probability for a fully-loaded ($R_L$=1.0) pipe $18A_0$ 16×16 crossbar switch is calculated according to Eng et al. to be:

$$P(\text{cell loss with one pipe}) = 3.67 \times 10^{-1}.$$

Recalling that this represents the probability that an ATM cell will not be successfully routed to the m×n output module. When an unsuccessfully routed ATM cell from pipe $18A_0$ is sent to pipe $18A_1$, the cell will encounter the same set of unsuccessfully routed ATM cells that existed with it in pipe $18A_0$. As a result, the probability of being blocked in both pipe $18A_0$ and pipe $18A_1$ can be considered as 16×32 growable packet switches, with m=2, n=1, and the switch loading is still given by $R_{a+b}$=$R_L$. For such a circuit, Eng et al. indicate that the resulting cell loss probability for a fully-loaded set of two pipes is:

$$P(\text{cell loss with two pipes}) = 1.03 \times 10^{-1}$$

Similar arguments can be used to show that:

$$P(\text{cell loss with three pipes}) = 2.33 \times 10^{-2}$$

and $$P(\text{cell loss with four pipes}) = 4.34 \times 10^{-3}$$

So, the switch fabric 14A shown in FIG. 3 has the advantage of relatively few switch points relative to a full crossbar implementation, but has the disadvantage of a relatively high and unacceptable internal blocking probability.

Figure 5:
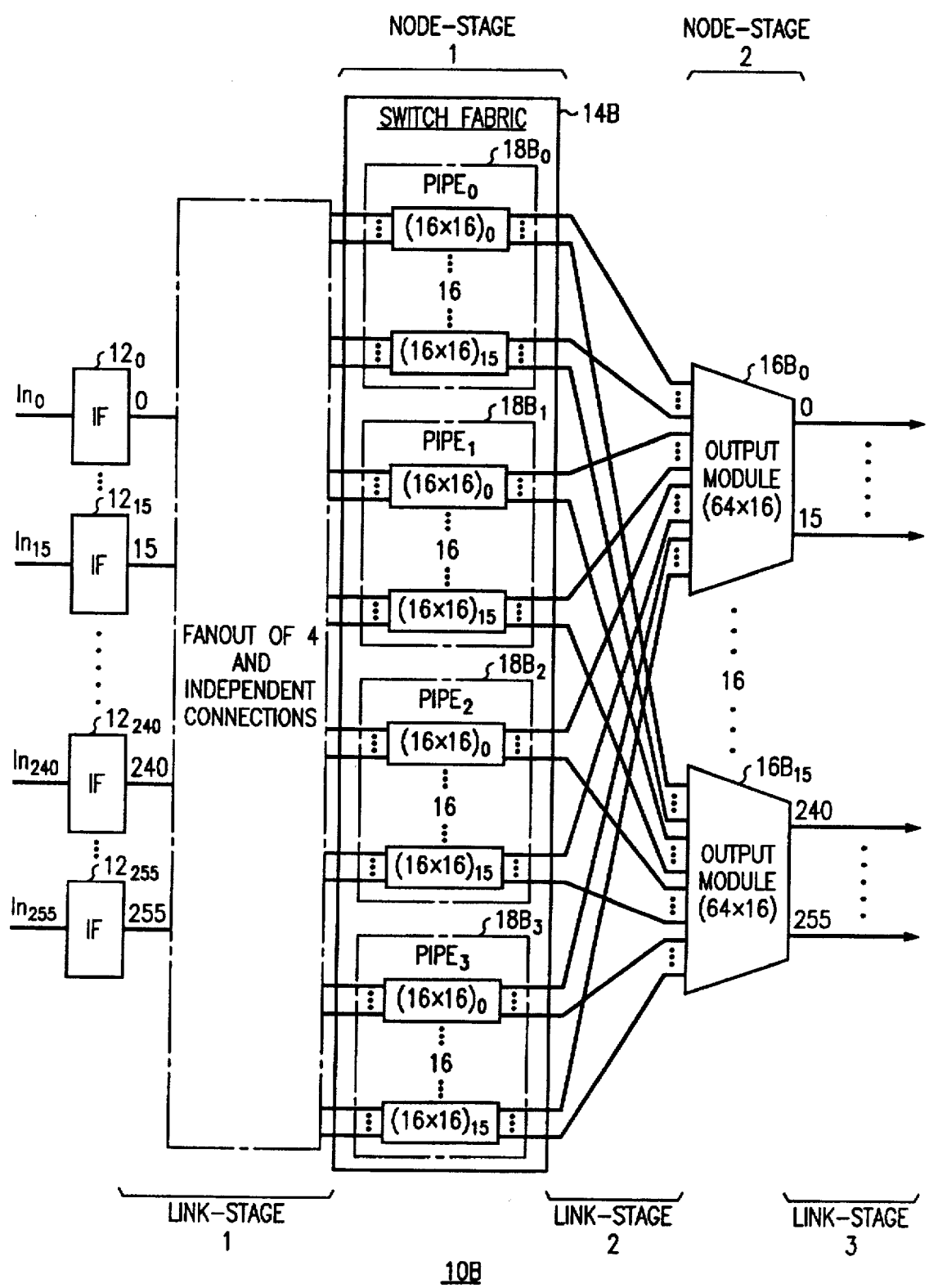
FIG. 5 is a block diagram of a switch fabric as in FIG. 3 except that the input connections to the partitions of the switch fabric are arranged to route packets through each partition independently from the routing of the other partitions.

Referring now to FIG. 5, a preferred design is shown for the switch fabric 14B which has multiple pipes $18B_0$–$18B_3$ having improved internal blocking characteristics. The improved performance is achieved if a different mapping function is used to define the connections between the input ports and the 16×16 crossbar switches. Since this modification only affects the connections between the input interfaces $12_0$–$12_{255}$ and the switch fabric inputs, this enhanced performance is obtained with essentially very small additional hardware costs.

An advantageous mapping function would produce connections which guarantee that if two input ports are connected to a common 16×16 crossbar switch in one pipe, then those two input ports will not be connected on a common 16×16 crossbar switch in any of the other pipes. In other words, two input ports will be connected on a common 16×16 crossbar switch at most once in the entire distribution network. This type of mapping function guarantees that the set of requested output ports for a group of ATM cells in one 16×16 crossbar switch are independent of the set of requested output ports for a group of ATM cells in any of the other 16×16 crossbar switches in any of the pipes.

In this system that contains more complicated mapping functions, each of the 16×16 crossbar switches in pipe $18B_0$ will again receive an offered traffic load equal to $R_a=R_L$. Thus, the cell loss probability of a single 16×16 crossbar switch in pipe $18B_0$ can be determined according to Eng et at., where m=1, n=1, and the switch loading is given by $R_a=R_L$. Using these assignments, the resulting cell loss probability for a fully-loaded ($R_L$=1.0) 16×16 crossbar switch of pipe $18B_0$ can be calculated from Eng et al. to be:

$$P(\text{cell loss in pipe } 18B_0)=3.67\times 10^{-1}$$

which is identical to the result in the previous embodiment. When an unsuccessfully routed ATM cell from pipe $18B_0$ is sent through the more complicated mapping function to pipe $18A_1$, the cell will encounter an entirely new set of unsuccessfully routed ATM cells that were also blocked (in different 16×16 crossbar switches) in pipe $18B_0$. As a result, the probability of being blocked in both pipe $18B_0$ and pipe $18B_1$ can be determined using a model of two 16×16 crossbar switches with an entirely different set of inputs between the pipe $18B_0$ and pipe $18B_1$ switches. These two 16×16 crossbar switches can be replaced by two growable packet switch models where the pipe $18B_0$ model has m=1, n=1, and $R_a=R_L$, and the resulting cell loss probability is $3.67\times 10^{-1}$ as given above. The pipe $18B_1$ may be considered as growable packet switch with m=1, n=1, and $$Rb=R_a\times P(\text{cell loss in pipe } 18B_0)=3.67\times 10^{-1}$$

This model assumes that all of the blocked traffic in pipe $18B_0$ is routed to pipe $18B_1$. Using these values, the resulting cell loss probability for a 16×16 crossbar switch in pipe $18B_1$ can be calculated to be:

$$P(\text{cell loss in pipe } 18B_1)=1.62\times 10^{-1}$$

and the fraction of all cells blocked in pipe $18B_0$ and pipe $18B_1$ is given by:

$$P(\text{cell loss of 2 pipes})=Rb\times P(\text{cell loss in pipe } 18B_1)=(3.67\times 10^{-1})(1.62\times 10^{-1})=5.94\times 10^{-2}$$

Similar arguments can be used to show that:

$$P(\text{cell loss of three pipes})=1.72\times 10^{-3}$$

and $$P(\text{cell loss of four pipes})=1.47\times 10^{-6}$$

All of these improvements in cell loss probabilities are the result of using a more complicated mapping function instead of the simple mapping function described previously. As indicated by these results, the distribution of residue, i.e. unsatisfied, path requests entering pipes $18A_1$, $18A_2$, and $18A_3$, for the simple mapping function are quite different from the distribution of residue, i.e. unsatisfied, path requests entering pipes $18B_1$, $18B_2$, and $18B_3$ for the more complicated mapping function shown in FIG. 5.

Given the advantages of the more complicated mapping function, it is desirable to identify a methodology that uniquely assigns each input port to a single input on one of the 16×16 crossbar switches in each of the pipes $18B_1$–$18B_3$ of switch fabric 14B so that two input ports will connect to a common 16×16 crossbar switch at most once in the entire switch fabric, thereby guaranteeing independence of the inputs. The mathematics of finite field theory, i.e., Galois field theory, provide the desired methodology and by applying mapping functions based on Galois field theory between the input ports of the fabric 14B and the 16×16 crossbar switches $17_0$-0 to $17_0$-15, $17_1$-0 to $17_1$-15, $17_2$-0 to $17_2$-15 and $17_3$-0 to $17_3$-15 independent connections may be determined.

To determine independent connection for the switch fabric 14B, assume that input port (I) can be represented by the eight-bit binary number ($i_7$, $i_6$, $i_5$, $i_4$, $i_3$, $i_2$, $i_1$, $i_0$), and assume that the 16×16 crossbar switch $S_\theta(I)$ to which it is routed in pipe $\theta$, e.g. pipe 0 through pipe 3 corresponding to pipe $18B_0$ through $18B_3$, can be represented by the six-bit binary number ($s_5$, $s_4$, $s_3$, $s_2$, $s_1$, $s_0$)$_\theta$. Using Galois field lo theory, many different sets of acceptable mapping functions that guarantee independence of input ports may be identified. One possible set of acceptable mapping functions for pipes $18B_0$–$18B_3$ for input ($i_7$, $i_6$, $i_5$, $i_4$, $i_3$, $i_2$, $i_0$) is given below:

$$(s_5, s_4, s_3, s_2, s_1, s_0)0=(0, 0, i_3, i_2, i_1, i_0)$$

$$(s_5, s_4, s_3, s_2, s_1, s_0)1=(0, 1, i_7 \text{ XOR } i_3, i_6 \text{ XOR } i_2, i_5 \text{ XOR } i_1, i_4 \text{ XOR } i_0)$$

$$(s_5, s_4, s_3, s_2, s_1, s_0)2=(1, 0, i_7 \text{ XOR } i_2, i_6 \text{ XOR } i_1, i_5 \text{ XOR } i_0 \text{ XOR } i_7, i_4 \text{ XOR } i_7)$$

$$(s_5, s_4, s_3, s_2, s_1, s_0)3=(1, 1, i_7 \text{ XOR } i_1, i_6 \text{ XOR } i_0 \text{ XOR } i_7, i_5 \text{ XOR } i_7 \text{ XOR } i_2, i_4 \text{ XOR } i_2)$$

In addition, network input ($i_7$, $i_6$, $i_5$, $i_4$, $i_3$, $i_2$, $i_1$, $i_0$) is connected to inlet $i_7$, $i_6$, $i_5$, $i_4$) on each of the 16×16 crossbar switches to which it is routed. When these link mappings, which are based on Galois field theory, are employed, the resulting set of interconnections between the input ports and the 16×16 crossbar switches of the switching fabric 14B are Galois connections. The results of the above mapping function when applied to the system shown in FIG. 5, are listed in the following pages. The connections listed are between switch fabric inputs 0–255 and four input ports on the four 16×16 crossbar switches in respective pipes $18B_0$–$18B_3$. The list is organized in the following manner. Each input #0–255, which corresponds to a respective output of input interfaces $12_0$–$12_{255}$, is fanned out to four switch input ports all having the same switch input port number. However, these four switch input ports (which all have the same number) are each on a different numbered 16×16 crossbar switch for each respective pipe. For example, input #21 connects to input port 5 of 16×16 crossbar switch #1 of pipe $18B_0$, input port 5 of 16×16 crossbar switch #4 of pipe $18B_1$, input port 5 of 16×16 crossbar switch #11 of pipe $18B_2$ and input port 5 of 16×16 crossbar switch #6. Thus, all of the independent connections according to the embodiment of the present invention shown in FIG. 5 are listed in the following pages.

| input #: 0 | input #: 128 |
| --- | --- |
| switch input port #: 10 | switch input port #: 0 |
| pipe 0 switch #: 0 | pipe 0 switch #: 8 |
| pipe 1 switch #: 0 | pipe 1 switch #: 8 |
| pipe 2 switch #: 0 | pipe 2 switch #: 8 |
| pipe 3 switch #: 0 | pipe 3 switch #: 8 |
| input #: 1 | input #: 129 |
| switch input port #: 1 | switch input port #: 1 |
| pipe 0 switch #: 0 | pipe 0 switch #: 8 |
| pipe 1 switch #: 1 | pipe 1 switch #: 9 |
| pipe 2 switch #: 2 | pipe 2 switch #: 10 |
| pipe 3 switch #: 4 | pipe 3 switch #: 12 |
| input #: 2 | input #: 130 |

```
switch input port #: 2         switch input port #: 2
pipe 0 switch #: 0             pipe 0 switch #: 8
pipe 1 switch #: 2             pipe 1 switch #: 10
pipe 2 switch #: 4             pipe 2 switch #: 12
pipe 3 switch #: 8             pipe 3 switch #: 0
input #: 3                     input #: 131
switch input port #: 3         switch input port #: 3
pipe 0 switch #: 0             pipe 0 switch #: 8
pipe 1 switch #: 3             pipe 1 switch #: 11
pipe 2 switch #: 6             pipe 2 switch #: 14
pipe 3 switch #: 12            pipe 3 switch #: 4
input #: 4                     input #: 132
switch input port #: 4         switch input port #: 4
pipe 0 switch #: 0             pipe 0 switch #: 8
pipe 1 switch #: 4             pipe 1 switch #: 12
pipe 2 switch #: 8             pipe 2 switch #: 0
pipe 3 switch #: 3             pipe 3 switch #: 11
input #: 5                     input #: 133
switch input port #: 5         switch input port #: 5
pipe 0 switch #: 0             pipe 0 switch #: 8
pipe 1 switch #: 5             pipe 1 switch #: 13
pipe 2 switch #: 10            pipe 2 switch #: 2
pipe 3 switch #: 7             pipe 3 switch #: 15
input #: 6                     input #: 134
switch input port #: 6         switch input port #: 6
pipe 0 switch #: 0             pipe 0 switch #: 8
pipe 1 switch #: 6             pipe 1 switch #: 14
pipe 2 switch #: 12            pipe 2 switch #: 4
pipe 3 switch #: 11            pipe 3 switch #: 3
input #: 7                     input #: 135
switch input port #: 7         switch input port #: 7
pipe 0 switch #: 0             pipe 0 switch #: 8
pipe 1 switch #: 7             pipe 1 switch #: 15
pipe 2 switch #: 14            pipe 2 switch #: 6
pipe 3 switch #: 15            pipe 3 switch #: 7
input #: 8                     input #: 136
switch input port #: 8         switch input port #: 8
pipe 0 switch #: 0             pipe 0 switch #: 8
pipe 1 switch #: 8             pipe 1 switch #: 0
pipe 2 switch #: 3             pipe 2 switch #: 11
pipe 3 switch #: 6             pipe 3 switch #: 14
input #: 9                     input #: 137
switch input port #: 9         switch input port #: 9
pipe 0 switch #: 0             pipe 0 switch #: 8
pipe 1 switch #: 9             pipe 1 switch #: 1
pipe 2 switch #: 1             pipe 2 switch #: 9
pipe 3 switch #: 2             pipe 3 switch #: 10
input #: 10                    input #: 138
switch input port #: 10        switch input port #: 10
pipe 0 switch #: 0             pipe 0 switch #: 8
pipe 1 switch #: 10            pipe 1 switch #: 2
pipe 2 switch #: 7             pipe 2 switch #: 15
pipe 3 switch #: 14            pipe 3 switch #: 6
input #: 11                    input #: 139
switch input port #: 11        switch input port #: 11
pipe 0 switch #: 0             pipe 0 switch #: 8
pipe 1 switch #: 11            pipe 1 switch #: 3
pipe 2 switch #: 5             pipe 2 switch #: 13
pipe 3 switch #: 10            pipe 3 switch #: 2
input #: 12                    input #: 140
switch input port #: 12        switch input port #: 12
pipe 0 switch #: 0             pipe 0 switch #: 8
pipe 1 switch #: 12            pipe 1 switch #: 4
pipe 2 switch #: 11            pipe 2 switch #: 3
pipe 3 switch #: 5             pipe 3 switch #: 13
input #: 13                    input #: 141
switch input port #: 13        switch input port #: 13
pipe 0 switch #: 0             pipe 0 switch #: 8
pipe 1 switch #: 13            pipe 1 switch #: 5
pipe 2 switch #: 9             pipe 2 switch #: 1
pipe 3 switch #: 1             pipe 3 switch #: 9
input #: 14                    input #: 142
switch input port #: 14        switch input port #: 14
pipe 0 switch #: 0             pipe 0 switch #: 8
pipe 1 switch #: 14            pipe 1 switch #: 6
pipe 2 switch #: 15            pipe 2 switch #: 7
pipe 3 switch #: 13            pipe 3 switch #: 5
input #: 15                    input #: 143
switch input port #: 15        switch input port #: 15
pipe 0 switch #: 0             pipe 0 switch #: 8 pipe 1 switch #: 15            pipe 1 switch #: 7
pipe 2 switch #: 13            pipe 2 switch #: 5
pipe 3 switch #: 9             pipe 3 switch #: 1
input #: 16                    input #: 144
switch input port #: 0         switch input port #: 0
pipe 0 switch #: 1             pipe 0 switch #: 9
pipe 1 switch #: 1             pipe 1 switch #: 9
pipe 2 switch #: 1             pipe 2 switch #: 9
pipe 3 switch #: 1             pipe 3 switch #: 9
input #: 17                    input #: 145
switch input port #: 1         switch input port #: 1
pipe 0 switch #: 1             pipe 0 switch #: 9
pipe 1 switch #: 0             pipe 1 switch #: 8
pipe 2 switch #: 3             pipe 2 switch #: 11
pipe 3 switch #: 5             pipe 3 switch #: 13
input #: 18                    input #: 146
switch input port #: 2         switch input port #: 2
pipe 0 switch #: 1             pipe 0 switch #: 9
pipe 1 switch #: 3             pipe 1 switch #: 11
pipe 2 switch #: 5             pipe 2 switch #: 13
pipe 3 switch #: 9             pipe 3 switch #: 1
input #: 19                    input #: 147
switch input port #: 3         switch input port #: 3
pipe 0 switch #: 1             pipe 0 switch #: 9
pipe 1 switch #: 2             pipe 1 switch #: 10
pipe 2 switch #: 7             pipe 2 switch #: 15
pipe 3 switch #: 13            pipe 3 switch #: 5
input #: 20                    input #: 148
switch input port #: 4         switch input port #: 4
pipe 0 switch #: 1             pipe 0 switch #: 9
pipe 1 switch #: 5             pipe 1 switch #: 13
pipe 2 switch #: 9             pipe 2 switch #: 1
pipe 3 switch #: 2             pipe 3 switch #: 10
input #: 21                    input #: 149
switch input port #: 5         switch input port #: 5
pipe 0 switch #: 1             pipe 0 switch #: 9
pipe 1 switch #: 4             pipe 1 switch #: 12
pipe 2 switch #: 11            pipe 2 switch #: 3
pipe 3 switch #: 6             pipe 3 switch #: 14
input #: 22                    input #: 150
switch input port #: 6         switch input port #: 6
pipe 0 switch #: 1             pipe 0 switch #: 9
pipe 1 switch #: 7             pipe 1 switch #: 15
pipe 2 switch #: 13            pipe 2 switch #: 5
pipe 3 switch #: 10            pipe 3 switch #: 2
input #: 23                    input #: 151
switch input port #: 7         switch input port #: 7
pipe 0 switch #: 1             pipe 0 switch #: 9
pipe 1 switch #: 6             pipe 1 switch #: 14
pipe 2 switch #: 15            pipe 2 switch #: 7
pipe 3 switch #: 14            pipe 3 switch #: 6
input #: 24                    input #: 152
switch input port #: 8         switch input port #: 8
pipe 0 switch #: 1             pipe 0 switch #: 9
pipe 1 switch #: 9             pipe 1 switch #: 1
pipe 2 switch #: 2             pipe 2 switch #: 10
pipe 3 switch #: 7             pipe 3 switch #: 15
input #: 25                    input #: 153
switch input port #: 9         switch input port #: 9
pipe 0 switch #: 1             pipe 0 switch #: 9
pipe 1 switch #: 8             pipe 1 switch #: 0
pipe 2 switch #: 0             pipe 2 switch #: 8
pipe 3 switch #: 3             pipe 3 switch #: 11
input #: 26                    input #: 154
switch input port #: 10        switch input port #: 10
pipe 0 switch #: 1             pipe 0 switch #: 9
pipe 1 switch #: 11            pipe 1 switch #: 3
pipe 2 switch #: 6             pipe 2 switch #: 14
pipe 3 switch #: 15            pipe 3 switch #: 7
input #: 27                    input #: 155
switch input port #: 11        switch input port #: 11
pipe 0 switch #: 1             pipe 0 switch #: 9
pipe 1 switch #: 10            pipe 1 switch #: 2
pipe 2 switch #: 4             pipe 2 switch #: 12
pipe 3 switch #: 11            pipe 3 switch #: 3
input #: 28                    input #: 156
switch input port #: 12        switch input port #: 12
pipe 0 switch #: 1             pipe 0 switch #: 9
pipe 1 switch #: 13            pipe 1 switch #: 5
pipe 2 switch #: 10            pipe 2 switch #: 2
```

-continued pipe 3 switch #: 4
input #: 29
switch input port #: 13
pipe 0 switch #: 1
pipe 1 switch #: 12
pipe 2 switch #: 8
pipe 3 switch #: 0
input #: 30
switch input port #: 14
pipe 0 switch #: 1
pipe 1 switch #: 15
pipe 2 switch #: 14
pipe 3 switch #: 12
input #: 31
switch input port #: 15
pipe 0 switch #; 1
pipe 1 switch #: 14
pipe 2 switch #: 12
pipe 3 switch #: 8
input #: 32
switch input port #: 0
pipe 0 switch #: 2
pipe 1 switch #: 2
pipe 2 switch #: 2
pipe 3 switch #: 2
input #: 33
switch input port #: 1
pipe 0 switch #: 2
pipe 1 switch #: 3
pipe 2 switch #: 0
pipe 3 switch #: 6
input #: 34
switch input port #: 2
pipe 0 switch #: 2
pipe 1 switch #: 0
pipe 2 switch #: 6
pipe 3 switch #: 10
input #: 35
switch input port #: 3
pipe 0 switch #: 2
pipe 1 switch #: 1
pipe 2 switch #: 4
pipe 3 switch #: 14
input #: 36
switch input port #: 4
pipe 0 switch #: 2
pipe 1 switch #: 6
pipe 2 switch #: 10
pipe 3 switch #: 1
input #: 37
switch input port #: 5
pipe 0 switch #: 2
pipe 1 switch #: 7
pipe 2 switch #: 8
pipe 3 switch #: 5
input #: 38
switch input port #: 6
pipe 0 switch #: 2
pipe 1 switch #: 4
pipe 2 switch #: 14
pipe 3 switch #: 9
input #: 39
switch input port #: 7
pipe 0 switch #: 2
pipe 1 switch #: 5
pipe 2 switch #: 12
pipe 3 switch #: 13
input #: 40
switch input port #: 8
pipe 0 switch #: 2
pipe 1 switch #: 10
pipe 2 switch #: 1
pipe 3 switch #: 4
input #: 41
switch input port #: 9
pipe 0 switch #: 2
pipe 1 switch #: 11
pipe 2 switch #: 3
pipe 3 switch #: 0
input #: 42 pipe 3 switch #: 12
input #: 157
switch input port #: 13
pipe 0 switch #: 9
pipe 1 switch #: 4
pipe 2 switch #: 0
pipe 3 switch #: 8
input #: 158
switch input port #: 14
pipe 0 switch #: 9
pipe 1 switch #: 7
pipe 2 switch #: 6
pipe 3 switch #: 4
input #: 159
switch input port #: 15
pipe 0 switch #: 9
pipe 1 switch #: 6
pipe 2 switch #: 4
pipe 3 switch #: 0
input #: 160
switch input port #: 0
pipe 0 switch #: 10
pipe 1 switch #: 10
pipe 2 switch #: 10
pipe 3 switch #: 10
input #: 161
switch input port #: 1
pipe 0 switch #: 10
pipe 1 switch #: 11
pipe 2 switch #: 8
pipe 3 switch #: 14
input #: 162
switch input port #: 2
pipe 0 switch #: 10
pipe 1 switch #: 8
pipe 2 switch #: 14
pipe 3 switch #: 2
input #: 163
switch input port #: 3
pipe 0 switch #: 10
pipe 1 switch #: 9
pipe 2 switch #: 12
pipe 3 switch #: 6
input #: 164
switch input port #: 4
pipe 0 switch #: 10
pipe 1 switch #: 14
pipe 2 switch #: 2
pipe 3 switch #: 9
input #: 165
switch input port #: 5
pipe 0 switch #: 10
pipe 1 switch #: 15
pipe 2 switch #: 0
pipe 3 switch #: 13
input #: 166
switch input port #: 6
pipe 0 switch #: 10
pipe 1 switch #: 12
pipe 2 switch #: 6
pipe 3 switch #: 1
input #: 167
switch input port #: 7
pipe 0 switch #: 10
pipe 1 switch #: 13
pipe 2 switch #: 4
pipe 3 switch #: 5
input #: 168
switch input port #: 8
pipe 0 switch #: 10
pipe 1 switch #: 2
pipe 2 switch #: 9
pipe 3 switch #: 12
input #: 169
switch input port #: 9
pipe 0 switch #: 10
pipe 1 switch #: 3
pipe 2 switch #: 11
pipe 3 switch #: 8
input #: 170

-continued switch input port #: 10
pipe 0 switch #: 2
pipe 1 switch #: 8
pipe 2 switch #: 5
pipe 3 switch #: 12
input #: 43
switch input port #: 11
pipe 0 switch #: 2
pipe 1 switch #: 9
pipe 2 switch #: 7
pipe 3 switch #: 8
input #: 44
switch input port #: 12
pipe 0 switch #: 2
pipe 1 switch #: 14
pipe 2 switch #: 9
pipe 3 switch #: 7
input #: 45
switch input port #: 13
pipe 0 switch #: 2
pipe 1 switch #: 15
pipe 2 switch #: 11
pipe 3 switch #: 3
input #: 46
switch input port #: 14
pipe 0 switch #: 2
pipe 1 switch #: 12
pipe 2 switch #: 13
pipe 3 switch #: 15
input #: 47
switch input port #: 15
pipe 0 switch #: 2
pipe 1 switch #: 13
pipe 2 switch #: 15
pipe 3 switch #: 11
input #: 48
switch input port #: 0
pipe 0 switch #: 3
pipe 1 switch #: 3
pipe 2 switch #: 3
pipe 3 switch #: 3
input #: 49
switch input port #: 1
pipe 0 switch #: 3
pipe 1 switch #: 2
pipe 2 switch #: 1
pipe 3 switch #: 7
input #: 50
switch input port #: 2
pipe 0 switch #: 3
pipe 1 switch #: 1
pipe 2 switch #: 7
pipe 3 switch #: 11
input #: 51
switch input port #: 3
pipe 0 switch #: 3
pipe 1 switch #: 0
pipe 2 switch #: 5
pipe 3 switch #: 15
input #: 52
switch input port #: 4
pipe 0 switch #: 3
pipe 1 switch #: 7
pipe 2 switch #: 11
pipe 3 switch #: 0
input #: 53
switch input port #: 5
pipe 0 switch #: 3
pipe 1 switch #: 6
pipe 2 switch #: 9
pipe 3 switch #: 4
input #: 54
switch #input port #: 6
pipe 0 switch #: 3
pipe 1 switch #: 5
pipe 2 switch #: 15
pipe 3 switch #: 8
input #: 55
switch input port #: 7
pipe 0 switch #: 3 switch input port #: 10
pipe 0 switch #: 10
pipe 1 switch #: 0
pipe 2 switch #: 13
pipe 3 switch #: 4
input #: 171
switch input port #: 11
pipe 0 switch #: 10
pipe 1 switch #: 1
pipe 2 switch #: 15
pipe 3 switch #: 0
input #: 172
switch input port #: 12
pipe 0 switch #: 10
pipe 1 switch #: 6
pipe 2 switch #: 1
pipe 3 switch #: 15
input #: 173
switch input port #: 13
pipe 0 switch #: 10
pipe 1 switch #: 7
pipe 2 switch #: 3
pipe 3 switch #: 11
input #: 174
switch input port #: 14
pipe 0 switch #: 10
pipe 1 switch #: 4
pipe 2 switch #: 5
pipe 3 switch #: 7
input #: 175
switch input port #: 15
pipe 0 switch #: 10
pipe 1 switch #: 5
pipe 2 switch #: 7
pipe 3 switch #: 3
input #: 176
switch input port #: 0
pipe 0 switch #: 11
pipe 1 switch #: 11
pipe 2 switch #: 11
pipe 3 switch #: 11
input #: 177
switch input port #: 1
pipe 0 switch #: 11
pipe 1 switch #: 10
pipe 2 switch #: 9
pipe 3 switch #: 15
input #: 178
switch input port #: 2
pipe 0 switch #: 11
pipe 1 switch #: 9
pipe 2 switch #: 15
pipe 3 switch #: 3
input #: 179
switch input port #: 3
pipe 0 switch #: 11
pipe 1 switch #: 8
pipe 2 switch #: 13
pipe 3 switch #: 7
input #: 180
switch input port #: 4
pipe 0 switch #: 11
pipe 1 switch #: 15
pipe 2 switch #: 3
pipe 3 switch #: 8
input #: 181
switch input port #: 5
pipe 0 switch #: 11
pipe 1 switch #: 14
pipe 2 switch #: 1
pipe 3 switch #: 12
input #: 182
switch input port #: 6
pipe 0 switch #: 11
pipe 1 switch #: 13
pipe 2 switch #: 7
pipe 3 switch #: 0
input #: 183
switch input port #: 7
pipe 0 switch #: 11 pipe 1 switch #: 4
pipe 2 switch #: 13
pipe 3 switch #: 12
input #: 56
switch input port #: 8
pipe 0 switch #: 3
pipe 1 switch #: 11
pipe 2 switch #: 0
pipe 3 switch #: 5
input #: 57
switch input port #: 9
pipe 0 switch #: 3
pipe 1 switch #: 10
pipe 2 switch #: 2
pipe 3 switch #: 1
input #: 58
switch input port #: 10
pipe 0 switch #: 3
pipe 1 switch #: 9
pipe 2 switch #: 4
pipe 3 switch #: 13
input #: 59
switch #input port #: 11
pipe 0 switch #: 3
pipe 1 switch #: 8
pipe 2 switch #: 6
pipe 3 switch #: 9
input #: 60
switch input port #: 12
pipe 0 switch #: 3
pipe 1 switch #: 15
pipe 2 switch #: 8
pipe 3 switch #: 6
input #: 61
switch input port #: 13
pipe 0 switch #: 3
pipe 1 switch #: 14
pipe 2 switch #: 10
pipe 3 switch #: 2
input #: 62
switch input port #: 14
pipe 0 switch #: 3
pipe 1 switch #: 13
pipe 2 switch #: 12
pipe 3 switch #: 14
input #: 63
switch input port #: 15
pipe 0 switch #: 3
pipe 1 switch #: 12
pipe 2 switch #: 14
pipe 3 switch #: 10
input #: 64
switch input port #: 0
pipe 0 switch #: 4
pipe 1 switch #: 4
pipe 2 switch #: 4
pipe 3 switch #: 4
input #: 65
switch input port #: 1
pipe 0 switch #: 4
pipe 1 switch #: 5
pipe 2 switch #: 6
pipe 3 switch #: 0
input #: 66
switch input port #: 2
pipe 0 switch #: 4
pipe 1 switch #: 6
pipe 2 switch #: 10
pipe 3 switch #: 12
input #: 67
switch input port #: 3
pipe 0 switch #: 4
pipe 1 switch #: 7
pipe 2 switch #: 2
pipe 3 switch #: 8
input #: 68
switch input port #: 4
pipe 0 switch #: 4
pipe 1 switch #: 0
pipe 2 switch #: 12 pipe 1 switch #: 12
pipe 2 switch #: 5
pipe 3 switch #: 4
input #: 184
switch input port #: 8
pipe 0 switch #: 11
pipe 1 switch #: 3
pipe 2 switch #: 8
pipe 3 switch #: 13
input #: 185
switch input port #: 9
pipe 0 switch #: 11
pipe 1 switch #: 2
pipe 2 switch #: 10
pipe 3 switch #: 9
input #: 186
switch input port #: 10
pipe 0 switch #: 11
pipe 1 switch #: 1
pipe 2 switch #: 12
pipe 3 switch #: 5
input #: 187
switch input port #: 11
pipe 0 switch #: 11
pipe 1 switch #: 0
pipe 2 switch #: 14
pipe 3 switch #: 1
input #: 188
switch input port #: 12
pipe 0 switch #: 11
pipe 1 switch #: 7
pipe 2 switch #: 0
pipe 3 switch #: 14
input #: 189
switch input port #: 13
pipe 0 switch #: 11
pipe 1 switch #: 6
pipe 2 switch #: 2
pipe 3 switch #: 10
input #: 190
switch input port #: 14
pipe 0 switch #: 11
pipe 1 switch #: 5
pipe 2 switch #: 4
pipe 3 switch #: 6
input #: 191
switch input port #: 15
pipe 0 switch #: 11
pipe 1 switch #: 4
pipe 2 switch #: 6
pipe 3 switch #: 2
input #: 192
switch input port #: 0
pipe 0 switch #: 12
pipe 1 switch #: 12
pipe 2 switch #: 12
pipe 3 switch #: 12
input #: 193
switch input port #: 1
pipe 0 switch #: 12
pipe 1 switch #: 13
pipe 2 switch #: 14
pipe 3 switch #: 8
input #: 194
switch input port #: 2
pipe 0 switch #: 12
pipe 1 switch #: 14
pipe 2 switch #: 8
pipe 3 switch #: 4
input #: 195
switch input port #: 3
pipe 0 switch #: 12
pipe 1 switch #: 15
pipe 2 switch #: 10
pipe 3 switch #: 0
input #: 196
switch input port #: 4
pipe 0 switch #: 12
pipe 1 switch #: 8
pipe 2 switch #: 4 pipe 3 switch #: 7
input #: 69
switch input port #: 5
pipe 0 switch #: 4
pipe 1 switch #: 1
pipe 2 switch #: 14
pipe 3 switch #: 3
input #: 70
switch input port #: 6
pipe 0 switch #: 4
pipe 1 switch #: 2
pipe 2 switch #: 8
pipe 3 switch #: 15
input #: 71
switch input port #: 7
pipe 0 switch #: 4
pipe 1 switch #: 3
pipe 2 switch #: 10
pipe 3 switch #: 11
input #: 72
switch input port #: 8
pipe 0 switch #: 4
pipe 1 switch #: 12
pipe 2 switch #: 7
pipe 3 switch #: 2
input #: 73
switch input port #: 9
pipe 0 switch #: 4
pipe 1 switch #: 13
pipe 2 switch #: 5
pipe 3 switch #: 6
input #: 74
switch input port #: 10
pipe 0 switch #: 4
pipe 1 switch #: 14
pipe 2 switch #: 3
pipe 3 switch #: 10
input #: 75
switch input port #: 11
pipe 0 switch #: 4
pipe 1 switch #: 15
pipe 2 switch #: 1
pipe 3 switch #: 14
input #: 76
switch input port #: 12
pipe 0 switch #: 4
pipe 1 switch #: 8
pipe 2 switch #: 15
pipe 3 switch #: 1
input #: 77
switch input port #: 13
pipe 0 switch #: 4
pipe 1 switch #: 9
pipe 2 switch #: 13
pipe 3 switch #: 5
input #: 78
switch input port #: 14
pipe 0 switch #: 4
pipe 1 switch #: 10
pipe 2 switch #: 11
pipe 3 switch #: 9
input #: 79
switch input port #: 15
pipe 0 switch #: 4
pipe 1 switch #: 11
pipe 2 switch #: 9
pipe 3 switch #: 13
input #: 80
switch input port #: 0
pipe 0 switch #: 5
pipe 1 switch #: 5
pipe 2 switch #: 5
pipe 3 switch #: 5
input #: 81
switch input port #: 1
pipe 0 switch #: 5
pipe 1 switch #: 4
pipe 2 switch #: 7
pipe 3 switch #: 1
input #: 82 pipe 3 switch #: 15
input #: 197
switch input port #: 5
pipe 0 switch #: 12
pipe 1 switch #: 9
pipe 2 switch #: 6
pipe 3 switch #: 11
input #: 198
switch input port #: 6
pipe 0 switch #: 12
pipe 1 switch #: 10
pipe 2 switch #: 0
pipe 3 switch #: 7
input #: 199
switch input port #: 7
pipe 0 switch #: 12
pipe 1 switch #: 11
pipe 2 switch #: 2
pipe 3 switch #: 3
input #: 200
switch input port #: 8
pipe 0 switch #: 12
pipe 1 switch #: 4
pipe 2 switch #: 15
pipe 3 switch #: 10
input #: 201
switch input port #: 9
pipe 0 switch #: 12
pipe 1 switch #: 5
pipe 2 switch #: 13
pipe 3 switch #: 14
input #: 202
switch input port #: 10
pipe 0 switch #: 12
pipe 1 switch #: 6
pipe 2 switch #: 11
pipe 3 switch #: 2
input #: 203
switch input port #: 11
pipe 0 switch #: 12
pipe 1 switch #: 7
pipe 2 switch #: 9
pipe 3 switch #: 6
input #: 204
switch input port #: 12
pipe 0 switch #: 12
pipe 1 switch #: 0
pipe 2 switch #: 7
pipe 3 switch #: 9
input #: 205
switch input port #: 13
pipe 0 switch #: 12
pipe 1 switch #: 1
pipe 2 switch #: 5
pipe 3 switch #: 13
input #: 206
switch input port #: 14
pipe 0 switch #: 12
pipe 1 switch #: 2
pipe 2 switch #: 3
pipe 3 switch #: 1
input #: 207
switch input port #: 15
pipe 0 switch #: 12
pipe 1 switch #: 3
pipe 2 switch #: 1
pipe 3 switch #: 5
input #: 208
switch input port #: 0
pipe 0 switch #: 13
pipe 1 switch #: 13
pipe 2 switch #: 13
pipe 3 switch #: 13
input #: 209
switch input port #: 1
pipe 0 switch #: 13
pipe 1 switch #: 12
pipe 2 switch #: 15
pipe 3 switch #: 9
input #: 210

-continued switch input port #: 2
pipe 0 switch #: 5
pipe 1 switch #: 7
pipe 2 switch #: 1
pipe 3 switch #: 13
input #: 83
switch input port #: 3
pipe 0 switch #: 5
pipe 1 switch #: 6
pipe 2 switch #: 3
pipe 3 switch #: 9
input #: 84
switch input port #: 4
pipe 0 switch #: 5
pipe 1 switch #: 1
pipe 2 switch #: 13
pipe 3 switch #: 6
input #: 85
switch input port #: 5
pipe 0 switch #: 5
pipe 1 switch #: 0
pipe 2 switch #: 15
pipe 3 switch #: 2
input #: 86
switch input port #: 6
pipe 0 switch #: 5
pipe 1 switch #: 3
pipe 2 switch #: 9
pipe 3 switch #: 14
input #: 87
switch input port #: 7
pipe 0 switch #: 5
pipe 1 switch #: 2
pipe 2 switch #: 11
pipe 3 switch #: 10
input #: 88
switch input port #: 8
pipe 0 switch #: 5
pipe 1 switch #: 13
pipe 2 switch #: 6
pipe 3 switch #: 3
input #: 89
switch input port #: 9
pipe 0 switch #: 5
pipe 1 switch #: 12
pipe 2 switch #: 4
pipe 3 switch #: 7
input #: 90
switch input port #: 10
pipe 0 switch #: 5
pipe 1 switch #: 15
pipe 2 switch #: 2
pipe 3 switch #: 11
input #: 91
switch input port #: 11
pipe 0 switch #: 5
pipe 1 switch #: 14
pipe 2 switch #: 0
pipe 3 switch #: 15
input #: 92
switch input port #: 12
pipe 0 switch #: 5
pipe 1 switch #: 9
pipe 2 switch #: 14
pipe 3 switch #: 0
input #: 93
switch input port #: 13
pipe 0 switch #: 5
pipe 1 switch #: 8
pipe 2 switch #: 12
pipe 3 switch #: 4
input #: 94
switch input port #: 14
pipe 0 switch #: 5
pipe 1 switch #: 11
pipe 2 switch #: 10
pipe 3 switch #: 8
input #: 95
switch input port #: 15
pipe 0 switch #: 5 switch input port #: 2
pipe 0 switch #: 13
pipe 1 switch #: 15
pipe 2 switch #: 9
pipe 3 switch #: 5
input #: 211
switch input port #: 3
pipe 0 switch #: 13
pipe 1 switch #: 14
pipe 2 switch #: 11
pipe 3 switch #: 1
input #: 212
switch input port #: 4
pipe 0 switch #: 13
pipe 1 switch #: 9
pipe 2 switch #: 5
pipe 3 switch #: 14
input #: 213
switch input port #: 5
pipe 0 switch #: 13
pipe 1 switch #: 8
pipe 2 switch #: 7
pipe 3 switch #: 10
input #: 214
switch input port #: 6
pipe 0 switch #: 13
pipe 1 switch #: 11
pipe 2 switch #: 1
pipe 3 switch #: 6
input #: 215
switch input port #: 7
pipe 0 switch #: 13
pipe 1 switch #: 10
pipe 2 switch #: 3
pipe 3 switch #: 2
input #: 216
switch input port #: 8
pipe 0 switch #: 13
pipe 1 switch #: 5
pipe 2 switch #: 14
pipe 3 switch #: 11
input #: 217
switch input port #: 9
pipe 0 switch #: 13
pipe 1 switch #: 4
pipe 2 switch #: 12
pipe 3 switch #: 15
input #: 218
switch input port #: 10
pipe 0 switch #: 13
pipe 1 switch #: 7
pipe 2 switch #: 10
pipe 3 switch #: 3
input #: 219
switch input port #: 11
pipe 0 switch #: 13
pipe 1 switch #: 6
pipe 2 switch #: 8
pipe 3 switch #: 7
input #: 220
switch input port #: 12
pipe 0 switch #: 13
pipe 1 switch #: 1
pipe 2 switch #: 6
pipe 3 switch #: 8
input #: 221
switch input port #: 13
pipe 0 switch #: 13
pipe 1 switch #: 0
pipe 2 switch #: 4
pipe 3 switch #: 12
input #: 222
switch input port #: 14
pipe 0 switch #: 13
pipe 1 switch #: 3
pipe 2 switch #: 2
pipe 3 switch #: 0
input #: 223
switch input port #: 15
pipe 0 switch #: 13 pipe 1 switch #: 10
pipe 2 switch #: 8
pipe 3 switch #: 12
input #: 96
switch input port #: 0
pipe 0 switch #: 6
pipe 1 switch #: 6
pipe 2 switch #: 6
pipe 3 switch #: 6
input #: 97
switch input port #: 1
pipe 0 switch #: 6
pipe 1 switch #: 7
pipe 2 switch #: 4
pipe 3 switch #: 2
input #: 98
switch input port #: 2
pipe 0 switch #: 6
pipe 1 switch #: 4
pipe 2 switch #: 2
pipe 3 switch #: 14
input #: 99
switch input port #: 3
pipe 0 switch #: 6
pipe 1 switch #: 5
pipe 2 switch #: 0
pipe 3 switch #: 10
input #: 100
switch input port #: 4
pipe 0 switch #: 6
pipe 1 switch #: 2
pipe 2 switch #: 14
pipe 3 switch #: 5
input #: 101
switch input port #: 5
pipe 0 switch #: 6
pipe 1 switch #: 3
pipe 2 switch #: 12
pipe 3 switch #: 1
input #: 102
switch input port #: 6
pipe 0 switch #: 6
pipe 1 switch #: 0
pipe 2 switch #: 10
pipe 3 switch #: 13
input #: 103
switch input port #: 7
pipe 0 switch #: 6
pipe 1 switch #: 1
pipe 2 switch #: 8
pipe 3 switch #: 9
input #: 104
switch input port #: 8
pipe 0 switch #: 6
pipe 1 switch #: 14
pipe 2 switch #: 5
pipe 3 switch #: 0
input #: 105
switch input port #: 9
pipe 0 switch #: 6
pipe 1 switch #: 15
pipe 2 switch #: 7
pipe 3 switch #: 4
input #: 106
switch input port #: 10
pipe 0 switch #: 6
pipe 1 switch #: 12
pipe 2 switch #: 1
pipe 3 switch #: 8
input #: 107
switch input port #: 11
pipe 0 switch #: 6
pipe 1 switch #: 13
pipe 2 switch #: 3
pipe 3 switch #: 12
input #: 108
switch input port #: 12
pipe 0 switch #: 6
pipe 1 switch #: 10
pipe 2 switch #: 13 pipe 1 switch #: 2
pipe 2 switch #: 0
pipe 3 switch #: 4
input #: 224
switch input port #: 0
pipe 0 switch #: 14
pipe 1 switch #: 14
pipe 2 switch #: 14
pipe 3 switch #: 14
input #: 225
switch input port #: 1
pipe 0 switch #: 14
pipe 1 switch #: 15
pipe 2 switch #: 12
pipe 3 switch #: 10
input #: 226
switch input port #: 2
pipe 0 switch #: 14
pipe 1 switch #: 12
pipe 2 switch #: 10
pipe 3 switch #: 6
input #: 227
switch input port #: 3
pipe 0 switch #: 14
pipe 1 switch #: 13
pipe 2 switch #: 8
pipe 3 switch #: 2
input #: 228
switch input port #: 4
pipe 0 switch #: 14
pipe 1 switch #: 10
pipe 2 switch #: 6
pipe 3 switch #: 13
input #: 229
switch input port #: 5
pipe 0 switch #: 14
pipe 1 switch #: 11
pipe 2 switch #: 4
pipe 3 switch #: 9
input #: 230
switch input port #: 6
pipe 0 switch #: 14
pipe 1 switch #: 8
pipe 2 switch #: 2
pipe 3 switch #: 5
input #: 231
switch input port #: 7
pipe 0 switch #: 14
pipe 1 switch #: 9
pipe 2 switch #: 0
pipe 3 switch #: 1
input #: 232
switch input port #: 8
pipe 0 switch #: 14
pipe 1 switch #: 6
pipe 2 switch #: 13
pipe 3 switch #: 8
input #: 233
switch input port #: 9
pipe 0 switch #: 14
pipe 1 switch #: 7
pipe 2 switch #: 15
pipe 3 switch #: 12
input #: 234
switch input port #: 10
pipe 0 switch #: 14
pipe 1 switch #: 4
pipe 2 switch #: 9
pipe 3 switch #: 0
input #: 235
switch input port #: 11
pipe 0 switch #: 14
pipe 1 switch #: 5
pipe 2 switch #: 11
pipe 3 switch #: 4
input #: 236
switch input port #: 12
pipe 0 switch #: 14
pipe 1 switch #: 2
pipe 2 switch #: 5

```
pipe 3 switch #: 3          pipe 3 switch #: 11
input #: 109                 input #: 237
switch input port #: 13      switch input port #: 13
pipe 0 switch #: 6           pipe 0 switch #: 14
pipe 1 switch #: 11          pipe 1 switch #: 3
pipe 2 switch #: 15          pipe 2 switch #: 7
pipe 3 switch #: 7           pipe 3 switch #: 15
input #: 110                 input #: 238
switch input port #: 14      switch input port #: 14
pipe 0 switch #: 6           pipe 0 switch #: 14
pipe 1 switch #: 8           pipe 1 switch #: 0
pipe 2 switch #: 9           pipe 2 switch #: 1
pipe 3 switch #: 11          pipe 3 switch #: 3
input #: 111                 input #: 239
switch input port #: 15      switch input port #: 15
pipe 0 switch #: 6           pipe 0 switch #: 14
pipe 1 switch #: 9           pipe 1 switch #: 1
pipe 2 switch #: 11          pipe 2 switch #: 3
pipe 3 switch #: 15          pipe 3 switch #: 7
input #: 112                 input #: 240
switch input port #: 0       switch input port #: 0
pipe 0 switch #: 7           pipe 0 switch #: 15
pipe 1 switch #: 7           pipe 1 switch #: 15
pipe 2 switch #: 7           pipe 2 switch #: 15
pipe 3 switch #: 7           pipe 3 switch #: 15
input #: 113                 input #: 241
switch input port #: 1       switch input port #: 1
pipe 0 switch #: 7           pipe 0 switch #: 15
pipe 1 switch #: 6           pipe 1 switch #: 14
pipe 2 switch #: 5           pipe 2 switch #: 13
pipe 3 switch #: 3           pipe 3 switch #: 11
input #: 114                 input #: 242
switch input port #: 2       switch input port #: 2
pipe 0 switch #: 7           pipe 0 switch #: 15
pipe 1 switch #: 5           pipe 1 switch #: 12
pipe 2 switch #: 3           pipe 2 switch #: 9
pipe 3 switch #: 15          pipe 3 switch #: 3
input #: 115                 input #: 243
switch input port #: 3       switch input port #: 3
pipe 0 switch #: 7           pipe 0 switch #: 15
pipe 1 switch #: 4           pipe 1 switch #: 12
pipe 2 switch #: 1           pipe 2 switch #: 9
pipe 3 switch #: 11          pipe 3 switch #: 3
input #: 116                 input #: 244
switch input port #: 4       switch input port #: 4
pipe 0 switch #: 7           pipe 0 switch #: 15
pipe 1 switch #: 3           pipe 1 switch #: 11
pipe 2 switch #: 15          pipe 2 switch #: 7
pipe 3 switch #: 4           pipe 3 switch #: 12
input #: 117                 input #: 245
switch input port #: 5       switch input port #: 5
pipe 0 switch #: 7           pipe 0 switch #: 15
pipe 1 switch #: 2           pipe 1 switch #: 10
pipe 2 switch #: 13          pipe 2 switch #: 5
pipe 3 switch #: 0           pipe 3 switch #: 8
input #: 118                 input #: 246
switch input port #: 6       switch input port #: 6
pipe 0 switch #: 7           pipe 0 switch #: 15
pipe 1 switch #: 1           pipe 1 switch #: 9
pipe 2 switch #: 11          pipe 2 switch #: 3
pipe 3 switch #: 12          pipe 3 switch #: 3
input #: 119                 input #: 247
switch input port #: 7       switch input port #: 7
pipe 0 switch #: 7           pipe 0 switch #: 15
pipe 1 switch #: 0           pipe 1 switch #: 8
pipe 2 switch #: 9           pipe 2 switch #: 1
pipe 3 switch #: 8           pipe 3 switch #: 0
input #: 120                 input #: 248
switch input port #: 8       switch input port #: 8
pipe 0 switch #: 7           pipe 0 switch #: 15
pipe 1 switch #: 15          pipe 1 switch #: 7
pipe 2 switch #: 4           pipe 2 switch #: 12
pipe 3 switch #: 1           pipe 3 switch #: 9
input #: 121                 input #: 249
switch input port #: 9       switch input port #: 9
pipe 0 switch #: 7           pipe 0 switch #: 15
pipe 1 switch #: 14          pipe 1 switch #: 6
pipe 2 switch #: 6           pipe 2 switch #: 14
pipe 3 switch #: 5           pipe 3 switch #: 13
input #: 122                 input #: 250 switch input port #: 10      switch input port #: 10
pipe 0 switch #: 7           pipe 0 switch #: 15
pipe 1 switch #: 13          pipe 1 switch #: 5
pipe 2 switch #: 0           pipe 2 switch #: 8
pipe 3 switch #: 9           pipe 3 switch #: 1
input #: 123                 input #: 251
switch input port #: 11      switch input port #: 11
pipe 0 switch #: 7           pipe 0 switch #: 15
pipe 1 switch #: 12          pipe 1 switch #: 4
pipe 2 switch #: 2           pipe 2 switch #: 10
pipe 3 switch #: 13          pipe 3 switch #: 5
input #: 124                 input #: 252
switch input port #: 12      switch input port #: 12
pipe 0 switch #: 7           pipe 0 switch #: 15
pipe 1 switch #: 11          pipe 1 switch #: 3
pipe 2 switch #: 12          pipe 2 switch #: 4
pipe 3 switch #: 2           pipe 3 switch #: 10
input #: 125                 input #: 253
switch input port #: 13      switch input port #: 13
pipe 0 switch #: 7           pipe 0 switch #: 15
pipe 1 switch #: 10          pipe 1 switch #: 2
pipe 2 switch #: 14          pipe 2 switch #: 6
pipe 3 switch #: 6           pipe 3 switch #: 14
input #: 126                 input #: 254
switch input port #: 14      switch input port #: 14
pipe 0 switch #: 7           pipe 0 switch #: 15
pipe 1 switch #: 9           pipe 1 switch #: 1
pipe 2 switch #: 8           pipe 2 switch #: 0
pipe 3 switch #: 10          pipe 3 switch #: 2
input #: 127                 input #: 255
switch input port #: 15      switch input port #: 15
pipe 0 switch #: 7           pipe 0 switch #: 15
pipe 1 switch #: 8           pipe 1 switch #: 0
pipe 2 switch #: 10          pipe 2 switch #: 2
pipe 3 switch #: 14          pipe 3 switch #: 6
```

Thus, it will now be understood that there has been disclosed a single stage switch fabric for a packet switch which has multiple partitions and reduced complexity. Further, by connecting inputs to each partition of the switch fabric using a mapping methodology that ensures independence, internal block within the switch fabric may be greatly reduced. While the invention has been particularly illustrated and described with reference to preferred embodiments thereof, it will be understood by those skilled in the art that various changes in form, details, and applications may be made therein. For example, the number of partitions may be other than four, other sizes of crossbar switches other than 16×16 may be used, other Galois mappings may be selected, and output modules other than 64×16 may be used. It is accordingly intended that the appended claims shall cover all such changes in form, details and applications which do not depart from the true spirit and scope of the invention.

What is claimed is:

1. For use in a telecommunication switch having N input lines and N output lines, a switch network, which has N inputs, P outputs and a fan-out of F with F being equal to a ratio of P/N, comprising:

a plurality of crossbar switches of number X, each having I/X inputs and P/FX outputs arranged in a single stage, where X/F is an integer that is greater than 1;

each of said N input lines farming out to a respective F inputs of I inputs;

each of said P outputs is connected to a respective input of an output module of a plurality of output modules, each of said output modules is a buffered concentrator concentrating F inputs into a respective output line; and the number of inputs I/X of each crossbar switch of said plurality of crossbar switches is less than the product of a number of input lines N and the value of the fan-in F.

2. The switch network according to claim 1, wherein the number of inputs I is an integer multiple of the number of input lines N.

3. The switch network according to claim 1, wherein each crossbar switch of said plurality of crossbar switches is a 16×16 crossbar switch.

4. The switch network according to claim 1, wherein said plurality of crossbar switches are divided into F pipes with each pipe having a respective connection that is connectable from an input via one of said plurality of output modules to each of said N output lines.

5. The switch network according to claim 4, wherein each of said crossbar switches is an electronic device.

6. The switch network according to claim 4, wherein each of said switches is a photonic device.

7. The switch network according to claim 6, wherein each photonic switch includes a SEED.

8. The switch network according to claim 1, wherein said crossbar switches are partitioned into a plurality of pipes.

9. The switch network according to claim 1, wherein said crossbar switches are partitioned into a plurality of independent pipes to reduce the internal blocking rate within the switching network.

10. The switch network according to claim 9, wherein the independence of said plurality of independent pipes is determined by Galois field theory.

11. A single stage switch fabric partitioned into multiple partitions, said switch fabric having inputs to each partition produced according to a method comprising the steps of:

representing each input port (I) by an eight-bit binary number $(i_7, i_6, i_5, i_4, i_3, i_2, i_1, i_0)$ which is designated S;

representing each 16×16 crossbar switch $S_\theta$ (I) to which the input port (I) is connected in partition $\theta$ by a six-bit binary number $(s_5, s_4, s_3, s_2, s_1, s_0)\theta$;

connecting each input port (I) to an input on a respective crossbar switch $S_\theta$ (I) in each of said partitions according to a set of mapping functions that determines the connections according to Galois field theory to effectively reduce the ATM cell blocking probability thereof; and determining the connections according to the set of mapping functions which are:

$(s_5, s_4, s_3, s_2, s_1, s_0)$ $0=(0, 0, i_3, i_2, i_1, i_0)$;

$(s_5, s_4, s_3, s_2, s_1, s_0)$ $1=(0, 1, i_7 \text{ XOR } i_3, i_6 \text{ XOR } i_2, i_5 \text{ XOR } i_1, i_4 \text{ XOR } i_0)$;

$(s_5, s_4, s_3, s_2, s_1, s_0)$ $2=(1, 0, i_7 \text{ XOR } i_2, i_6 \text{ XOR } i_1, i_5 \text{ XOR } i_0 \text{ XOR } i_7, i_4 \text{ XOR } i_7)$ and $(s_5, s_4, s_3, s_2, s_1)$ $3=(1, 1, i_7 \text{ XOR } i_1, i_6 \text{ XOR } i_0 \text{ XOR } i_7, i_5 \text{ XOR } i_7 \text{ XOR } i_2, i_4 \text{ XOR } I_2)$.

12. A switch fabric for use in a telecommunications having a plurality of input lines connected to a plurality of line interfaces and a plurality of output lines connected to outputs of a plurality of output modules, said switch fabric comprising:

a plurality of pipes with each pipe having a plurality of inputs, with each of said plurality of pipe inputs connecting to a respective output of said plurality of line interfaces such that each of said line interfaces has a fan-out equal to the number of said plurality of pipes;

each of said pipes is a single stage network and provides a single path from any line interface output to an output line via an output module of the plurality of output modules;

each of said output modules having a concentration ratio that is equal in number to the amount of the fan-out of the line interface outputs; and each path between an input line and its desired output line is sufficiently independent from the other paths through the other pipes between that input line and that desired output line that the probability of internal blocking is low wherein reducing the number of paths available to connect any input line to any output line to the same as the number of pipes substantially reduces the number of active devices needed for connections without an equivalent rise in the internal blocking probability.

* * * * *

UNITED STATES PATENT AND TRADEMARK OFFICE
CERTIFICATE OF CORRECTION

PATENT NO. : 5,687,172  
DATED : November 11, 1997  
INVENTOR(S) : Thomas J. Cloonan, Gaylord W. Richards Page 1 of 1

It is certified that error appears in the above-identified patent and that said Letters Patent is hereby corrected as shown below:

Column 18, claim 1,
Line 59, delete "farming" and insert -- fanning --.

Signed and Sealed this

Eighteenth Day of December, 2001

Attest:

Attesting Officer

JAMES E. ROGAN  
Director of the United States Patent and Trademark Office